(12) United States Patent
Cammert et al.

(10) Patent No.: US 8,788,484 B2
(45) Date of Patent: Jul. 22, 2014

(54) SYSTEMS AND/OR METHODS FOR USER FEEDBACK DRIVEN DYNAMIC QUERY REWRITING IN COMPLEX EVENT PROCESSING ENVIRONMENTS

(75) Inventors: Michael Cammert, Wettenberg (DE); Christoph Heinz, Marburg (DE); Jürgen Krämer, Alsfeld (DE); Tobias Riemenschneider, Schwalmstadt (DE)

(73) Assignee: Software AG, Darmstadt (DE)

( * ) Notice: Subject to any disclaimer, the term of this patent is extended or adjusted under 35 U.S.C. 154(b) by 442 days.

(21) Appl. No.: 12/978,863

(22) Filed: Dec. 27, 2010

(65) Prior Publication Data

US 2012/0166421 A1 Jun. 28, 2012

(51) Int. Cl.
*G06F 17/30* (2006.01)

(52) U.S. Cl.
USPC .................. 707/718; 707/765; 707/E17.017; 707/E17.064

(58) Field of Classification Search
None
See application file for complete search history.

(56) References Cited

U.S. PATENT DOCUMENTS

| | | | |
|---|---|---|---|
| 7,457,728 B2 | 11/2008 | Chen et al. | |
| 7,676,461 B2 | 3/2010 | Chkodrov et al. | |
| 8,396,865 B1 * | 3/2013 | Ie et al. | 707/723 |
| 2005/0010556 A1 * | 1/2005 | Phelan | 707/3 |
| 2006/0106793 A1 * | 5/2006 | Liang | 707/5 |
| 2009/0024622 A1 * | 1/2009 | Chkodrov et al. | 707/6 |
| 2009/0144323 A1 * | 6/2009 | Tang | 707/103 Y |
| 2011/0035396 A1 * | 2/2011 | Merz et al. | 707/759 |
| 2013/0073546 A1 * | 3/2013 | Yan et al. | 707/732 |

OTHER PUBLICATIONS

Cammert, et al., "A Cost-Based Approach to Adaptive Resource Management in Data Stream Systems," IEEE Transactions on Knowledge and Data Engineering, pp. 1-20.
Dittrich, et al., "On Producing Join Results Early," Extended Abstract, PODS 2003, Jun. 9-12, 2003, pp. 134-142.
Kramer, et al., "Dynamic Plan Migration for Snapshot-Equivalent Continuous Queries in Data Stream Systems," University of Marburg, Germany and Hong Kong University of Science and Technology, China.
Shanmugasundaram, et al., "Architecting a Network Query Engine for Producing Partial Results," Department of Computer Sciences, University of Wisconsin, IBM Almaden Research Center, and Department of Computer Science, Oregon Graduate Institute.
Dittrich, et al., "Progressive Merge Join: A Generic and Non-Blocking Sort-Based Join Algorithm," Proceedings of the 28$^{th}$ VLDB Conference, Hong Kong, China, 2002, pp. 1-12.

* cited by examiner

*Primary Examiner* — Anteneh Girma
(74) *Attorney, Agent, or Firm* — Nixon & Vanderhye, P.C.

(57) ABSTRACT

Certain example embodiments described herein relate to techniques for user feedback driven dynamic query rewriting in complex event processing (CEP) environments. In certain example embodiments, the adjustment of already-initiated queries may be permitted during runtime in order to help continuously or substantially continuously meet a user's requirements. In certain example embodiments, parameters of a query may be adapted dynamically, e.g., without the need to redeploy it. Adaptable parameters in certain example embodiments may be identified and/or based on, for instance, an automatic determination from original query creation, user specifications, the way in which a user interacts with a user interface for visualizing the results of queries, etc.

20 Claims, 8 Drawing Sheets

SYSTEMS AND/OR METHODS FOR USER FEEDBACK DRIVEN DYNAMIC QUERY REWRITING IN COMPLEX EVENT PROCESSING ENVIRONMENTS

FIELD OF THE INVENTION

Certain example embodiments described herein relate to executing queries in complex event processing (CEP) environments. More particularly, certain example embodiments described herein relate to techniques for user feedback driven dynamic query rewriting in CEP environments. In certain example embodiments, the adjustment of already-initiated queries may be permitted during runtime. Adaptable parameters in certain example embodiments may be identified and/or based on, for instance, an automatic determination from original query creation, user specifications, the way in which a user interacts with a user interface for visualizing the results of queries, etc.

BACKGROUND AND SUMMARY OF EXAMPLE EMBODIMENTS OF THE INVENTION

Complex event processing (CEP) is designed to continuously process incoming events in a push-based manner in order to provide results for given queries. These continuous queries are usually deployed to a system, and users may subscribe to their results. While the queries are typically designed to meet the requirements of the users, the users' satisfaction may decrease because of factors such as, for example, changes in user preferences, the characteristics of the input streams, etc. Adapting the system to the user's modified requirements usually involves starting new queries, which are often modified versions of the old ones. Depending on the skills of the user, for example, this may even require involving information technology staff or persons with specific or deep knowledge of the processing and/or business environment to help build, deploy, and/or initiate newly developed queries.

CEP is a relatively new field, but there are several commercially available techniques that relate to query formulation and result presentation. These currently available CEP query formulation and result presentation techniques typically borrow ideas from the Database Management System (DBMS) field.

Database management systems generally execute queries once and usually in a rather short time window using a pull-based approach. If the user is not satisfied with the results, the user may modify the query and execute it again. Graphical user interfaces (GUIs) exist in order to help enable users to adjust parameters of such queries. Changing the settings of the queries via GUIs or the like allows a query to be modified before it is executed again. Unfortunately, however, this approach involves changing parameters between subsequent executions of separate, ad-hoc queries. It thus will be appreciated that there is no ability to modify continuous CEP queries during runtime. Furthermore, it will be appreciated that the crafting of new queries may require specific or deep knowledge of the processing system, business environment, etc.

As DBMS queries are not continuous, there conventionally has been no need to modify them at runtime. Nevertheless, basic ideas for doing so have been proposed in the past. Such proposals have generally involved merely providing the possibility for presentation of early results (e.g., such as those results that are available prior to completion of query execution) and providing the possibility to abort the execution of a query in progress in the event that the at least some results indicate that yet further results would be of little or no additional use or value.

Conventional CEP engines, which as noted above borrow ideas from the DBMS field, typically support the formulation of queries using a query language (such as, for example, SQL) and/or some graphical query building tool. Depending on user skills and the application domain, for example, this query formulation may be performed by a business user who also will use the query results. In some cases, the user may require assistance from others. After the formulation of queries has been completed, the prepared queries can be executed.

Graphical user interfaces that present the results of CEP queries to users sometimes allow for modifying the way that the results are presented or the way that one or more portions of the results are shown. As such, results are collected and a view of them is prepared while the original query stays unchanged within the CEP engine. And although research has been conducted on how the resource consumption of CEP engines can be measured and predicted, the risk of a CEP engine running out of resources while executing a set of queries remains.

DBMS query modification techniques—and many CEP techniques based on them—unfortunately suffer from disadvantages that DBMS have with respect to CEP engines in the domain of continuous queries over data streams.

Furthermore, with respect to current CEP systems, if the user is no longer satisfied with a query within a CEP engine, the user will have to stop it and start an updated version of the query. As alluded to above, this may require assistance from other people, as the user may not be familiar with the applicable query formulation techniques. Moreover, stopping a query and starting an alternative one may cause downtime, as executing new CEP queries likely will take some time before being able to provide new or updated results in many cases. And although potential downtime can be reduced by continuing the execution of the old query while the new one is being initialized, it will be appreciated that this approach will typically involve additional resources for the parallel execution of both versions of the query.

While substantially reducing the risk of a system overload, techniques developed for adapting CEP queries at runtime with respect to their resource usage have not been directed to improving the user experience by adapting query results with respect to a user's preferences.

Indeed, approaches that allow the user to dynamically configure result presentations (e.g., by selecting a portion of buffered query results for presentation) do not influence the query execution within the system. In order to be able to provide a wide spectrum of possible results, they have to continuously derive many results that afterwards may be discarded in whole or in part by the presentation layer. This approach involves substantial overhead and potentially a considerable amount of waste with respect to resource usage of the CEP engine.

Thus, it will be appreciated that there is a need in the art for improved techniques for preparing, executing, modifying, and/or visualizing queries in a CEP environment where data continuously or substantially continuously streams in.

One aspect of certain example embodiments relates to the ability to modify continuous complex event processing (CEP) queries during runtime. In certain example embodiments, the results of the queries are presented in a graphical user interface (GUI) manipulable by a user, where such manipulations may (1) provide an indication as to whether and which parameters may be of interest, (2) enable query customization based on such parameters, and/or (3) affect the execution of the queries. In cases where the execution of the queries is affected, modifications may be made in certain example embodiments without having to restart a query and/or without having to run different versions of a query or different queries in parallel.

Another aspect of certain example embodiments relates to allowing for the adjustment of already-initiated queries during runtime in order to help continuously or substantially continuously meet a user's requirements. In certain example embodiments, parameters of a query may be adapted dynamically, e.g., without the need to redeploy it. Adaptable parameters may in certain example instances be determined automatically from the original query.

Another aspect of certain example embodiments relates to gathering information regarding how to adjust parameters of a CEP query based on, for example, direct user feedback or interaction with a user interface, monitoring of user behavior, etc. Elements of a user interface according to certain example embodiments (e.g., a GUI) may help allow the user to provide concrete instructions or at least "hints" as to how the output of the query may or should be changed.

Another aspect of certain example embodiments relates to collecting information about how the user actually uses an interface according to certain example embodiments. Based on this or other information (e.g., information described herein as being collected or derived), certain example embodiments may further derive appropriate changes to the system parameters that may adapt the future query behavior.

Still another aspect of certain example embodiments relates to adapting CEP queries at runtime to help improve the user experience by adapting query results with respect to the user's preferences, influencing the CEP queries themselves (e.g., provided that resources are available), and/or helping to manage the utilization of resources.

Yet another aspect of certain example embodiments relates to modifying the result of a computational process rather than the result presentation, which may in certain example embodiments help conserve resources.

In certain example embodiments, a method of executing queries in a complex event processing (CEP) environment is provided. A stream of continuous event data is received. A query to be run on the received stream is identified, with the query including at least one adaptable parameter. The identified query is executed. Results of the identified query are displayed in a user interface. Via the user interface, input indicative of a change to the adaptable parameter is received. The identified query is modified based on the received input, with the query being dynamically modified during runtime and as the stream of continuous event data is being received.

In certain example embodiments, a method of configuring a system for executing queries in a complex event processing (CEP) environment is provided. User input defining at least one continuous query to be run on at least one stream of event data is received. The at least one query is parsed so as to (a) identify at least one adaptable parameter within the at least one query and (b) develop a logical query plan or graph based on the user input defining the query, with the logical query plan or graph describing at a high level steps to be performed when the query is run. The logical query plan or graph is translated into a physical query plan or graph, with the physical query plan or graph including executable logic to be used in the execution of the query. In connection with the translating of the logical query plan or graph into the physical query plan or graph, access points enabling a user to dynamically modify the at least one adaptable parameter of the at least one query at runtime without interrupting execution of the at least one query and while continuing to receive the at least one stream of event data are registered.

In certain example embodiments, a method of executing a query in a complex event processing (CEP) environment is provided. A system may be configured in accordance with the above-described or another method. The identified query is executed. Results of the identified query are displayed in a user interface. The query is updated based on (a) user input received via a user interface indicative of a change to the at least one adaptable parameter directly, and/or (b) a way in which the user interacts with the user interface. The updating is performed without redeploying the query.

In certain example embodiments, there are provided non-transitory computer readable storage mediums tangibly storing instructions that, when executed by at least one processor of a system, perform the above-described and/or other methods.

In certain example embodiments, there are provided systems for implementing the above-described and/or other methods. For instance, in certain example embodiments, a continuous event processing (CEP) system is provided. An adapter is configured to receive data from at least one event stream. A query design tool is configured to receive user input corresponding to at least one query executable on at least one said event stream. A query parser is configured to (a) identify at least one adaptable parameter within the at least one query and (b) develop a corresponding logical query plan or graph based on the at least one query, with each said corresponding logical query plan or graph specifying steps to be performed when the query is run. A query translator is configured to translate each said logical query plan or graph into a corresponding physical query plan or graph, with each said physical query plan or graph including executable logic to be used in the execution of the query. A register of access points enables a user to dynamically modify the at least one adaptable parameter of the at least one query at runtime without having to redeploy the at least one query and while continuing to receive the at least one stream of event data. At least one processor is configured to execute the at least one query on the at least one stream based on the physical query plan or graph. A user interface is configured to display results of the query executed by the at least one processor, with the user interface including one or more elements enabling the user to adjust the at least one adaptable parameter using the register of access points.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments provide the ability to modify continuous complex event processing (CEP) queries during runtime. In certain example embodiments, the results of the queries are presented in a graphical user interface (GUI) manipulable by a user, where such manipulations may (1) provide an indication as to whether and which parameters may be of interest, (2) enable query customization based on such parameters, and/or (3) affect the execution of the queries. In cases where the execution of the queries is affected, modifications may be made in certain example embodiments without having to restart a query and/or without having to run different versions of a query or different queries in parallel.

Figure 1:
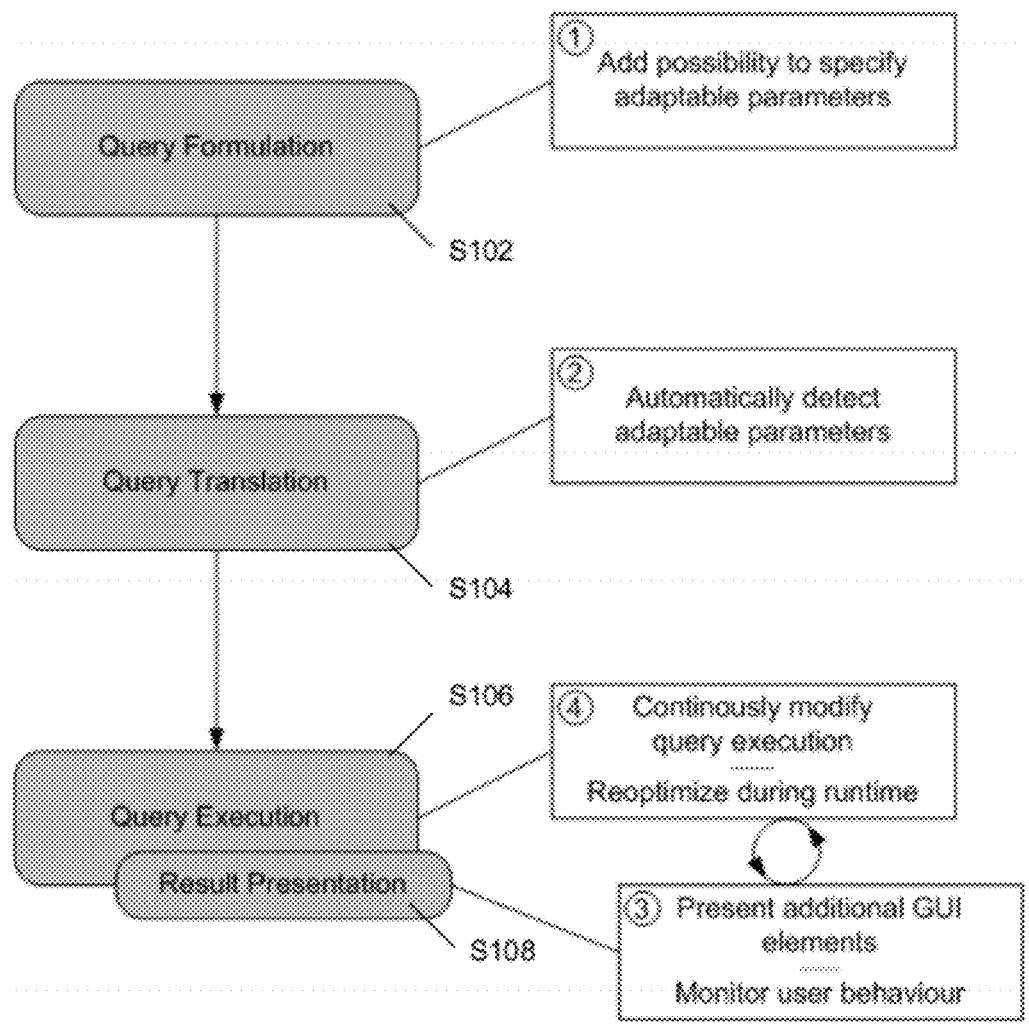
FIG. 1 is an illustrative complex event processing (CEP) process, including steps from query formulation to query execution and result presentation that has been modified in accordance with certain example embodiments.

Referring now more particularly to the drawings, FIG. 1 is an illustrative overview of a CEP process, including steps from query formulation to query execution and result presentation that has been modified in accordance with certain example embodiments. Basic CEP process steps are shown to the left of FIG. 1, and modifications to such steps in accordance with certain example embodiments are shown to the right. For instance, the query formulation process (step S102) may be enriched by methods to specify potential parameters that are modifiable at runtime. For example, the BETWEEN construct of SQL usually allows a user to specify a lower and an upper bound for a value. A typical BETWEEN query is of the following form:
SELECT * FROM STREAM WHERE VALUE BETWEEN 5 AND 8;

This conventional BETWEEN construct may be extended in accordance with certain example embodiments, e.g., to allow for the specification of ranges for the respective bounds. Such an extension may take the following form:
SELECT * FROM STREAM WHERE VALUE BETWEEN [4, 6] AND [7, 9];

In the example of the extended BETWEEN construct above, the upper and lower bounds may range from 4-6 and 7-9, respectively. The square brackets in certain example embodiments may be taken as a signal as to where within particular constructs adaptable parameters are located.

It will be appreciated that the possibility of manually crafting queries using the extended construct may present an additional opportunity for potentially more experienced users. However, in certain example embodiments, the parameters for the extensions and/or the values for the parameters may be generated automatically, e.g., in accordance with the example techniques disclosed below.

Other examples of parameters modifiable at runtime include window sizes (e.g., time intervals, counts, etc., in accordance with the example extension specified above), temporal granularity (e.g., consider value changes only with respect to a temporal resolution of X seconds/minutes/hours/ etc.; consider value changes only with respect to a temporal resolution of X seconds/minutes/hours/etc. for data set Y, every M seconds/minutes/hours/etc. for data set N, etc.), diversity of grouping, join selectivity (e.g., for band joins), detail grade of projections, size of history for user interface elements, etc.

During the query translation process, parameters are identified that may be modified dynamically at runtime. Additionally, possible ranges for such parameters may be computed. As the variety of such modifications is potentially large, an initial subset of such modifications may be chosen for use at start of the query. This selection process may be performed automatically using the "hints" given by the user during query formulation, by using system-wide and/or user specific general preferences, inherent knowledge about the data, etc. For example, a user could specify that a BETWEEN-bound variable in a range of 10% relative to the value given within the original query is always to be accepted. System-wide preferences may indicate that temporal window sizes should never exceed 24 hours, count based windows should never exceed 10,000 elements, etc. Inherent knowledge may include factors such as negative time entries being inadmissible, hours worked per day being within an acceptable sub-range of the 24 hour maximum period, etc.

The query plan or query graph, which is the result of the translation process (step S104), may be extended by mechanisms that allow changing parameters at runtime. In the BETWEEN example, instead of using a precompiled fixed predicate within a filter operator, a dynamic predicate instead may be installed whose boundaries may be changed using an access point generated during query translation. As indicated above, the automatic detection of adaptable parameters may be facilitated by the inclusion of values within square brackets in a case where a user textually scripts a query, by the selection or other explicit indication of an adaptable parameter in the case of a graphically created query or a query by example created query, etc.

It will be appreciated that the techniques of how a user can give hints to the system (and/or how a system can extract hints from a user) depend at least in part on the particular query formulation technique (e.g., query language, graphical query formulation, query by example, etc.) being implemented. Several examples using SQL are presented below, with conventional SQL being adapted so as to support CEP queries with temporal structures. Numerical and/or other constants are building blocks of SQL queries. Of course, although the examples that follow use SQL, it will be appreciated that other established, proprietary, custom, or customized query formulation techniques may be used in different example implementations.
SELECT * FROM stream1 WHERE x<10;

This SQL statement selects all elements from stream1 for which x is less than 10.
SELECT avg (y) FROM stream2 WINDOW (RANGE 3 HOURS);

This SQL statement selects the average value of y in stream2 during the last 3 hours.
SELECT max(y) FROM stream7 WINDOW (COUNT 5);

This SQL statement selects the maximum of the last five values of y in stream7.
SELECT * FROM stream3 where z BETWEEN 5 AND 10;

This SQL statement selects all elements from stream3 for which z is at least 5 and at most 10.

```
SELECT id FROM stream4 MATCHING(
    MEASURES id Integer
    PATTERN 'ab{3}'
    DEFINE a DO id = x
        b AS id = x
);
```

This SQL statement selects all IDs that occurred in stream4 and subsequently appeared three more times. This example uses a SQL language extension for pattern matching.

In certain example embodiments, in order to perform an automatic detection of adjustable or adaptable query parameters, the system may simply make all numeric parameters adjustable or adaptable.

In certain example embodiments, as an extension, the system could additionally or alternatively use query rewriting in order to add additional numeric parameters to adjust. For example:

SELECT x FROM stream5 where x<y; may be treated the same as SELECT x FROM stream5 where 1*x<1*y;

SELECT x FROM stream5 where x=5; may be treated the same as SELECT x FROM stream5 where x BETWEEN 5 AND 5

A further choice would be the ranges in which those parameters may be extended. There could be system-wide rules such as, for example, a predetermined percentage (e.g., 10%, 20%, etc.) "plus or minus" tolerance.

As alluded to above, there may be a large number of possible numeric parameters and possible ranges. It therefore may be advisable to include hints by the user for the individual queries in order to help fit the user's requirements. The following example syntax may be used for such hints, although other example syntax of course is possible for achieving the same, similar, or different functionalities:

x: the exact value x

[x]: the numeric value may be varied with respect to a range proposed by the system

[x,y]: the numeric value may be varied between x and y.

[x,y,z]: the numeric value may be varied between x and z, an the initial default is y.

[x|n %]: the numeric value may be varied between $(1-n\%)*x$ and $(1+n\%)*x$.

In certain example embodiments, it is possible to introduce additional extensions, thereby introducing yet further flexibility and adaptability. For instance, by specifying [x,y~id] and [a,b~id] in the same query, the user may indicate that the first value should vary between x and y (i.e., value1=x+(y−x)*f where 0<=f<=1), while the second may vary between a and b (i.e., value2=a+(b−a)*g where 0<=g<=1). By using the same id in both specifications, the user may indicate that f should be equal to g, which means that both parameters could be adapted using for instance one slider bar in a GUI, as if the one parameters is at the upper bound, the other also is, and so on.

In certain example embodiments, the choice of GUI elements may vary with the language constructs and data types. For example, a double slider may be used for the BETWEEN construct; a simple slider, control dial, drop down list, menu or the like may be used for a simple value, etc. For discrete values (e.g., integers), a drop down or other menu listing the possible values may be provided, as may a text field (possibly with additional up and down buttons) may be provided. Of course, these and/or other elements may be used for these and/or other variables in different example implementations.

Referring once again to FIG. 1, during query execution (step S106), the usage of the GUI by the users may be continuously or substantially continuously monitored. The modifications implied by user interaction with selected UI-elements provided for dynamically adapting query parameters during runtime may be performed. For instance, a change to a time window, specification of lower and/or upper bounds, etc., may result in the dynamic adaptation of query parameters during runtime and may also correspondingly update the result presentation (e.g., as performed in step S108).

In addition, or in the alternative, the interaction with other GUI elements may be monitored and used as an additional source of information for adapting queries and/or identifying adaptable parameters. For example, if the GUI includes several pages, screens, menus, or the like, with each of them presenting the result of a query, the distribution of time for which the pages were displayed within a larger certain period of time may be used as an indicator as to queries that currently are of particular interest. As an example result, the quality of the results for queries flagged as being of potential interest may be enhanced by increasing their granularity or temporal window size, elevating the priority of any processes associated therewith, etc. In certain example embodiments, a user may be automatically prompted to confirm whether such modifications should be made based on an automatic detection and supposition regarding the relative importance of queries. For instance, the user may be presented with a display (1) indicating that the system has detected that a particular query has been run often or scrutinized for a lengthy period of time, and (2) also asking the user whether the query should receive special attention (e.g., in terms of resources dedicated to its execution), whether its accuracy can or should be improved in any way (which may be automatically suggested in certain cases), etc.

As alluded to above, the overall monitoring and modification of queries may also take system resources into account in certain example scenarios. This may include, for instance, prediction of bottlenecks and respective modifications to query parameters. Because modified parameters (e.g., an increased selectivity) may also affect the efficiency of a certain query plan, dynamic re-optimization and plan migration also may be performed so as to help ensure the smooth operation of the system. Example techniques for dynamic plan migration, including re-optimization, are described in Jürgen Krämer et al., *Dynamic Plan Migration for Snapshot-Equivalent Continuous Queries in Data Stream Systems*, Proc. of the International Conference on Semantics of a Networked World (ICSNW), March 2006, Munich, Germany. The entire contents of this article is hereby incorporated herein by reference.

The modification of an existing CEP engine in order to support the example features disclosed herein may involve determining which parts of the query language (e.g., the SQL language) could potentially be enriched by clauses allowing for influencing dynamic parameters. The query parser (e.g., the program logic at least partially responsible for breaking down the queries into digestible and potentially tokenizable elements in accordance with techniques similar to those implemented in connection with conventional query language and classic database theories) may be extended accordingly following such determinations.

The parser also may be configured (or reconfigured) to gather potentially dynamic parameters and to include this information in the logical query plan or graph it generates. During this process, the parser may make use of preferences specified for the system and by the users. For example, if a user specifies that the temporal window size of the queries should be within 20% of the ones specified in the queries, for a query with window size 10 hours, the translator would correspondingly generate a window operator that is able to modify its window size between 8 and 12 hours. As will be appreciated, the logical query plan or graph may be thought of as a high level description (and potentially visual depiction) of what steps are to be performed when a query is to be run. By contrast, a physical query plan or graph may be thought of as a lower level description of how the logical query plan or graph is to be carried out. Example logical and physical query plans or graphs are discussed in greater detail below.

An optimizer may be modified in order to optimize the logical query plan based on the initial settings of the parameters. In certain example instances, there may be a variety of ways that a logical query plan or graph may be executed. Similar to conventional query language and database theoretic concepts, the optimizer of certain example embodiments may help select a or the way in which the logical query plan or graph is to be performed. This selection may be based in part on heuristics, the assignment of weights and/or costs to a particular model, etc.

A translator may be configured to generate a physical query plan or graph for executing the query, with the physical query plan providing access points for dynamically modifying the chosen parameters. These access points may be registered with the system in order to make them accessible to/from the GUI layer.

An example of the conversion from a logical query plan or graph to a physical query plan or graph will now be provided. In this example, a data stream named "PersonsInRoom" is provided and carries information about persons (name and age) located within a room. An illustrative query that determines the names of persons of age up to 30 within the room is to be run on the PersonsInRoom data stream. Formulated in SQL (for data streams), the query would be as follows:
SELECT name FROM PersonsInRoom WHERE age<=30;

The parsing of this textual query and the translation into the logical query plan (by the parser of certain example embodiments) may result in a logical query plan that represents the actions that are to be taken in order to execute the query, namely, checking whether age is 30 or less for elements within the stream "PersonsInRoom" and selecting the name(s) of any such person(s).

Figure 2:
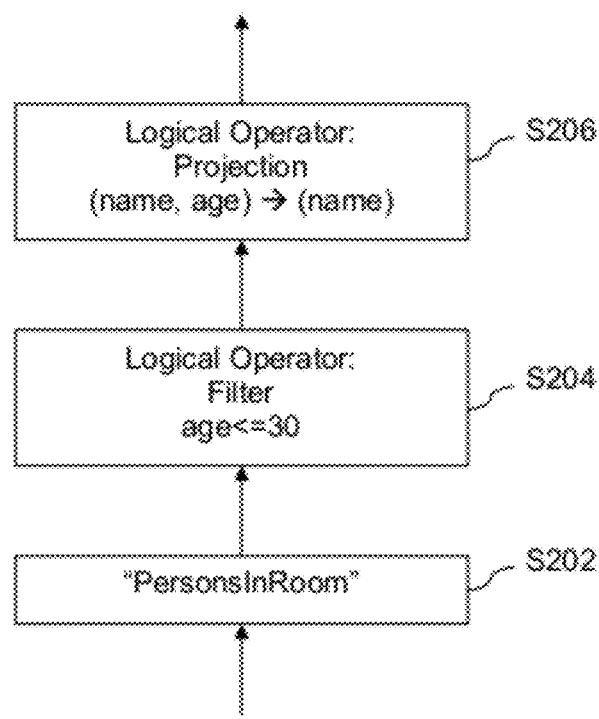
FIG. 2 is an example logical plan or graph associated with an illustrative query on a PersonsInRoom data stream.

FIG. 2 is an example logical plan or graph associated with an illustrative query on a PersonsInRoom data stream. The stream itself is received in step S202. The "filter" logical operator is run in step S204 to identify elements in the PersonsInRoom data stream with an age of less than or equal to 30. In step S206, the projection logical operator is run so as to reduce the (name, age) tuple to (name), as that is the only piece of information requested by the query.

Figure 3:
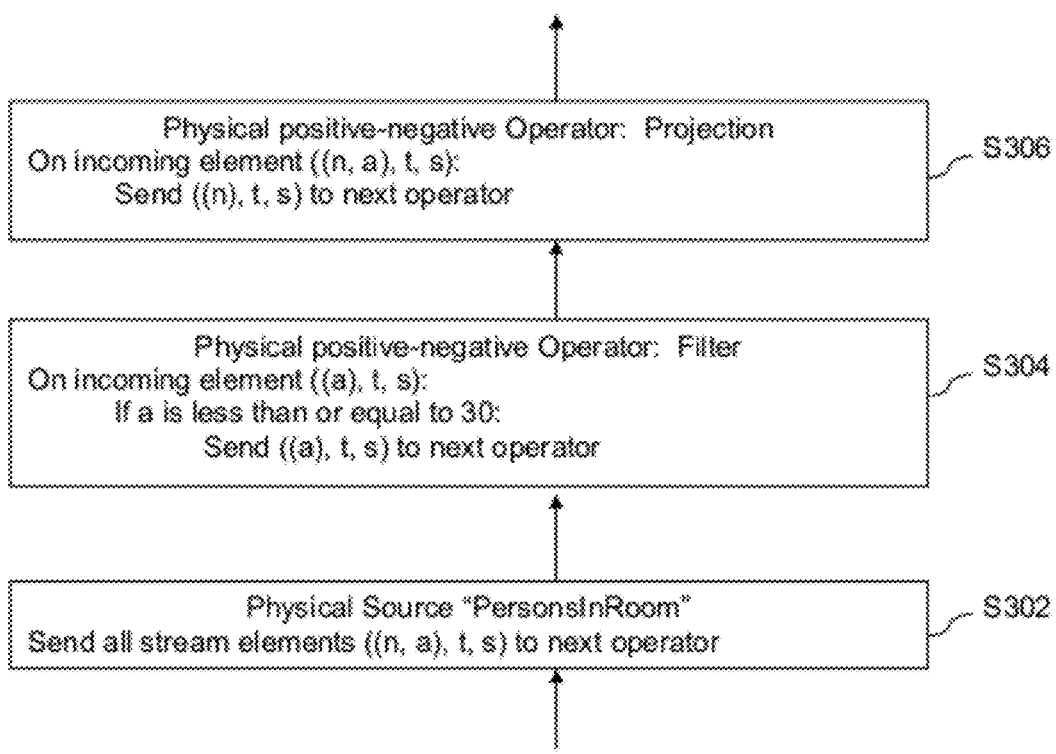
FIG. 3 is an example physical query plan or graph corresponding to the FIG. 2 example logical query plan or graph.

This logical query graph may now be translated into a physical query plan or graph (by the translator of certain example embodiments). As alluded to above, the physical query plan or graph includes concrete operators able to execute the CEP query. FIG. 3 is an example physical query plan or graph corresponding to the FIG. 2 example logical query plan or graph. It will be appreciated that the FIG. 3 example physical query plan or graph includes a textual representation of the executable operations and is provided using pseudo-code.

In the FIG. 3 example, the physical source is identified as the PersonsInRoom data stream in step S302 and passed along to the next operator. The stream elements each include name (n), age (a), time (t), and a sign (s). Step S304 involves the filtering discussed above, and illustrative pseudo-code for accomplishing the same is shown in FIG. 3. Similarly, step S306 involves the projection discussed above, and illustrative pseudo-code for accomplishing the same is shown in FIG. 3. It will be appreciated that the physical query plan or graph differs from the logical query plan or graph, for example, in that it includes executable logic and also may pass along other data not specifically requested during query formulation (including, for example, a timestamp and sign).

In accordance with the techniques described herein, the query reflected in the logical and physical query plans or graphs in FIGS. 2 and 3, respectively, may have adaptable parameters either explicitly identified by the user or automatically identified by the system. One example is that the age may be specified as an adaptable parameter at design time or query formulation, or identified as such during query translation. In such a case, the adaptable query may be represented as follows:
SELECT name FROM PersonsInRoom WHERE age<=[30];

Upper and/or lower bounds for age may be specified or identified in different embodiments, e.g., in accordance with the nomenclature identified herein, as may temporal windows or spatial areas of interest. Of course, other variables also may be made adaptable in different implementations.

Figure 4:
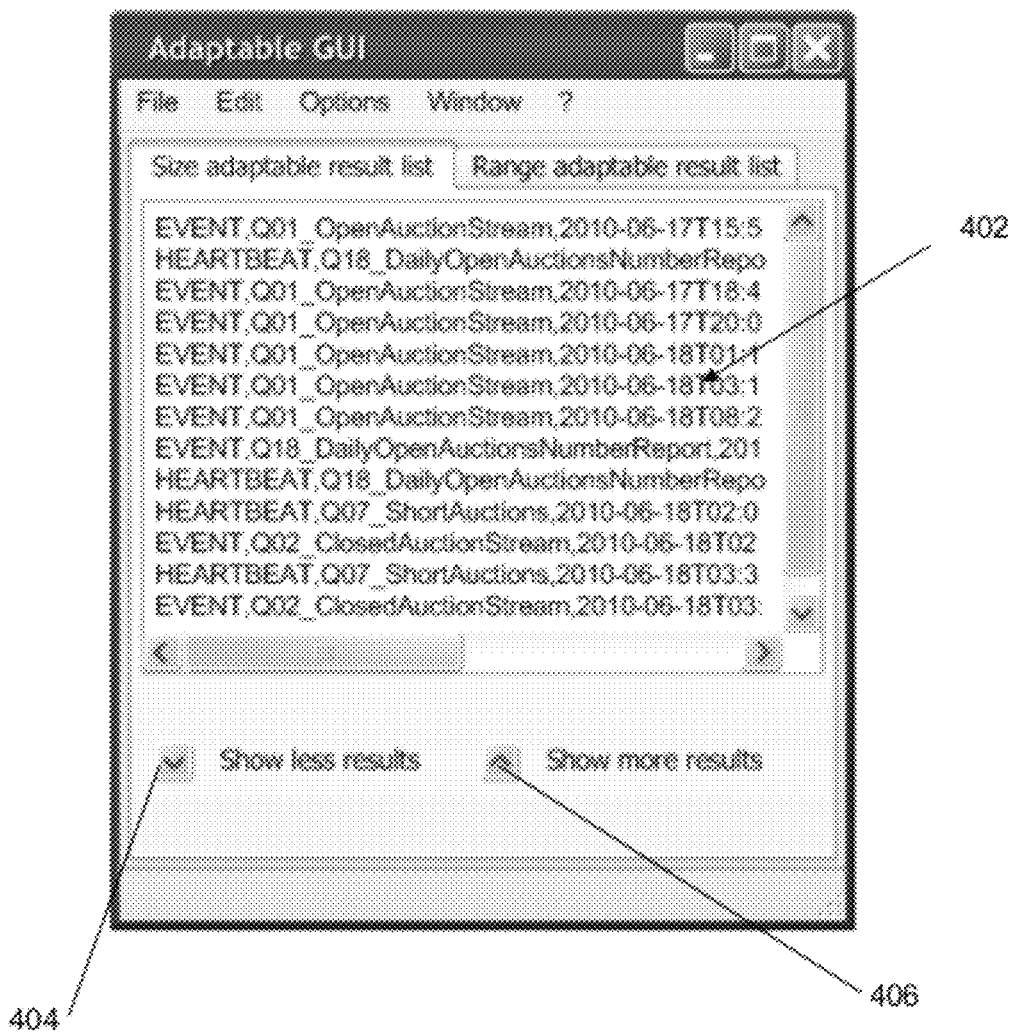
FIGS. 4-5 are example GUIs that include various example GUI elements that may be used for user interaction with adaptable parameters and/or modifiable queries in accordance with certain example embodiments.
Figure 5:

As indicated above, the GUI framework also may be extended in order to help provide elements for direct user interaction with regard to the parameters. FIGS. 4-5 are example GUIs that include various example GUI elements that may be used for user interaction with adaptable parameters and/or modifiable queries in accordance with certain example embodiments. The FIG. 4 example GUI relates to a query that selects average values with respect to a temporal sliding window of size one hour from a stream. The temporal window is adaptable, and the SQL-like query is as follows:
SELECT AVG(VALUE) FROM STREAM WINDOW (RANGE [1] HOUR);

Example results of this query are displayed in the display area 402. To adjust the adaptable parameter, the up and down control buttons 404 and 406 may be depressed. These up and down control buttons 404 and 406 may adjust the temporal range by predetermined intervals, which also may be specified in certain example embodiments. As an example of how user interaction may affect variables, the adjustments initially may be made in 15 minute increments. However, if it is detected that the user only inputs two or more clicks to one of the buttons 404 or 406, the adjustment interval may be set to 30 minutes.

The FIG. 5 example GUI relates to a query that selects stream parameters in accordance with the extended BETWEEN construct discussed in detail above. In particular, the upper and lower bounds are set to 4-6 and 7-9, respectively, as specified by the following SQL-like query:
SELECT * FROM STREAM WHERE VALUE BETWEEN [4, 6] AND [7, 9];

Example results of this query are displayed in the display area 502. In this case, slider bars are set so as to be adjustable at the left- and right-hand extremes corresponding to the lower and upper bounds specified in/identified from the query. The left slider bar 504 is movable between 4 and 6, and the right slider bar 506 is movable between 7 and 9, in accordance with the query.

Additionally, functionality for monitoring user behavior (such as, for example, the average residence time for a page of the UI) also may be added. As indicated above, the monitoring of such behaviors may be used to further refine or suggest refinements to the queries, inform decisions regarding which parameters are adaptable, the range of adaptations possible, etc.

Figure 6:
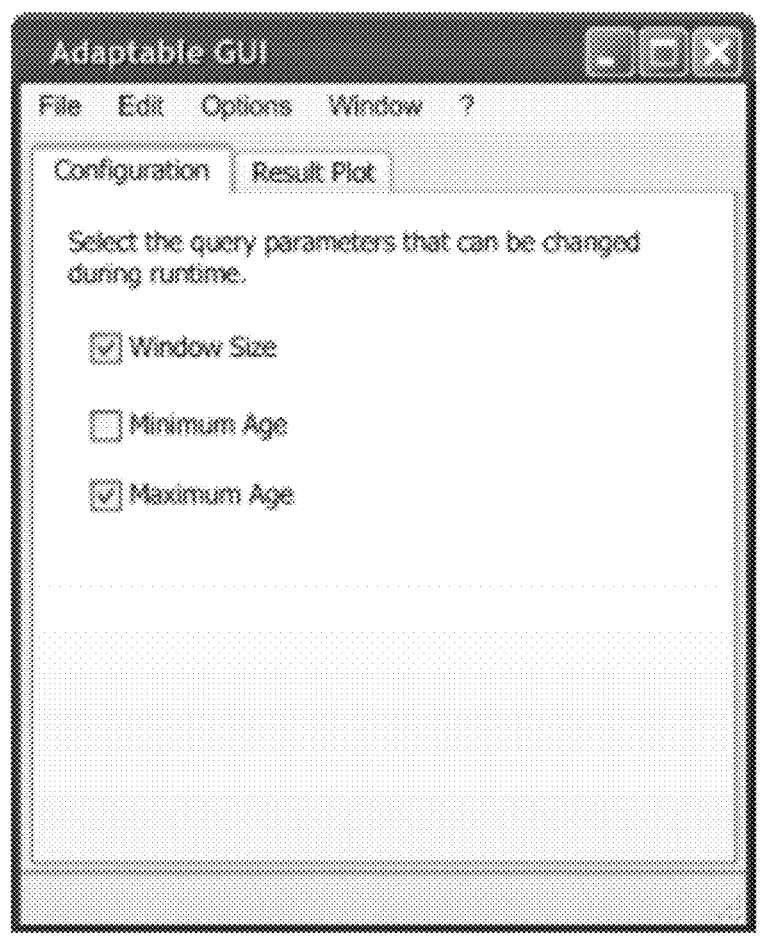
FIGS. 6-7 are further example GUIs that demonstrate adaptable parameters being automatically detected and confirmed, and then a corresponding plot being generated, in accordance with certain example embodiments.
Figure 7:
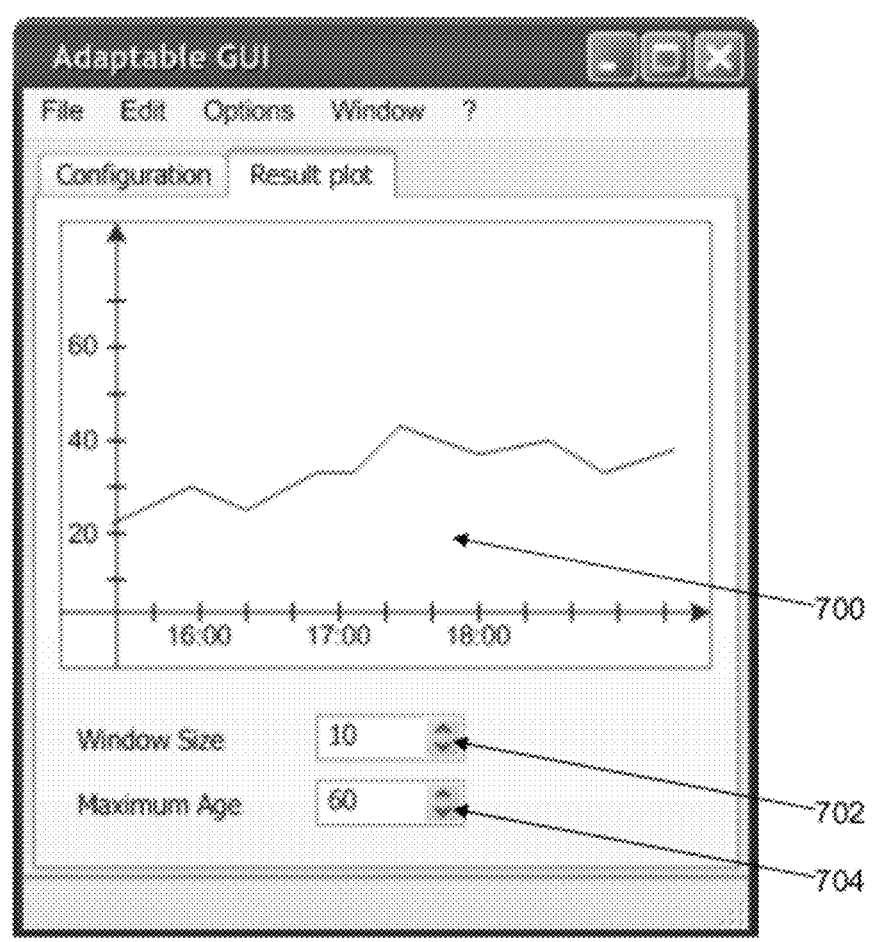

FIGS. 6-7 are further example GUIs that demonstrate adaptable parameters being automatically detected and confirmed, and then a corresponding plot being generated, in accordance with certain example embodiments. This example involves the following illustrative query, which computes the average age of the last 10 persons in the stream PersonsInRoom with an age between 20 and 60:
SELECT AVG(AGE)
FROM PersonsInRoom WINDOW(ROWS 10)
WHERE AGE BETWEEN 20 AND 60;

In this example, the user has not provided any hints as to which parameters may be changeable or adaptable. One way to automatically detect changeable or adaptable parameters is to identify numerical parameters. Thus, the system may generate a display as shown in FIG. 6, for example. As will be appreciated from the FIG. 6 example, the system has automatically identified the window and age variables as numeric variables. It further has detected that the age variable has upper and lower bounds specified. Thus, the user may decide using the user interface which of these variables may be adjusted. More particularly, in the FIG. 6 illustration, the checkboxes indicate that the user has selected the window size (or the number of persons considered with respect to the count based window) and the maximum age (or the upper bound of the between range) as the changeable or adaptable parameters.

Given the illustrative specifications from the FIG. 6 example, the query results and GUI elements for adapting the query may be shown in accordance with FIG. 7. As shown in FIG. 7, first and second control elements 702 and 704 have been provided for adapting or changing the window size and maximum age parameters, respectively, e.g., based on the decisions made using the FIG. 6 example GUI. Of course, if the minimum age variable were selected using the FIG. 6 example GUI, a control element would have been added for it, as well. Similarly, control element 702 would not have been added to the FIG. 7 presentation if the window size had not been selected, etc. The display area 700 may be updated dynamically based on changes to the first and/or second control elements 702/704 in certain example embodiments.

Although the example described in connection with FIGS. 6-7 involves the detection of numerical parameters, other techniques also are possible. For example, the presence of binary or true/false parameters also may be detected, as may the presence of categorical variables, e.g., from queries in accordance with certain example implementations. In other example embodiments, these and/or other techniques may be implemented. In certain example implementations, a database schema or other similar structure may be analyzed for example.

Figure 8:
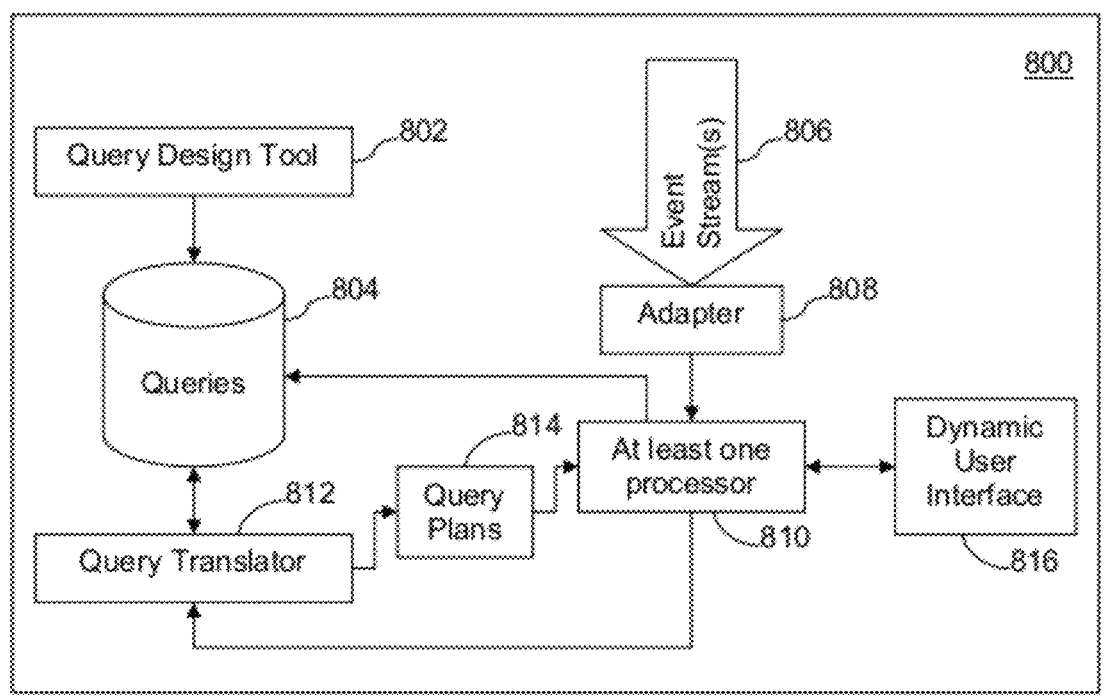
FIG. 8 is an illustrative architectural diagram for an example system for user feedback drive dynamic query rewriting in a CEP environment in accordance with certain example embodiments.

FIG. 8 is an illustrative architectural diagram for an example system 800 for user feedback drive dynamic query rewriting in a CEP environment in accordance with certain example embodiments. A query design tool 802 aids a user in formulating queries that are stored in the query repository or data store 804. As indicated above, a user may directly specify one or more adaptable parameters within a formulated query, hints may be provided to help the system 800 locate the one or more adaptable parameters within the formulated query, etc. A query parser (not shown) may help to break down a visually or otherwise generated query into a format suitable for storage in the query repository 804, for example. For instance, the query parser may help generate a corresponding logical query plan or graph and the translator may generate a physical query plan or graph for executing the generated query. It also may help automatically identify adaptable parameters.

One or more event streams 806 are received by an adapter 808 in communication with at least one processor 810. The at least one processor 810 processes the queries stored in the query repository 804 against the event stream(s) 806. Therefore, the at least one processor 810 uses the physical query plans generated by the query translator 812. The query translator 812 may interface with the query repository 804 in that regard.

As indicated above, the query translator 812 is configured to generate a corresponding physical query plan or graph 814 for executing the query, with the physical query plan 814 providing access points for dynamically modifying the chosen parameters. The physical query plan 814 is executed by the at least one processor 810, and the results are presented in the dynamic user interface 816. It will be appreciated that the query translator 812 may develop a physical query plans at any suitable point(s) during runtime and/or design time. For example, the query translator 812 may generate a physical query plan based on a logical query plan ex ante, e.g., immediately after the query is designed. Alternatively, or in addition, more ad hoc physical query plan creation also is possible at runtime.

Inputs provided to the dynamic user interface 816 may be fed back to the at least one processor 810. The at least one processor 810, in turn, may analyze such inputs and use them as clues as to how the presentation layer may be modified, where new adaptable parameters may be found, how processing of the queries should be adjusted, etc. For instance, a user lingering on a particular view of a query may indicate that that query is of particular interest and should be afforded processing preferences over lesser viewed or skipped query views. As another example, temporal window defaults may be changed based on user input.

Furthermore, as an example, for the whole system, a monitoring thread (not shown in FIG. 8) may be added to help continuously monitor user behavior and periodically check for possible adaptations to the parameters. For example, at predetermined time intervals (e.g., every ten minutes), the time granularity of a query that was viewed most often during the last hour may be increased. The global monitoring may also be used for re-optimization and dynamic plan migration at runtime.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of executing queries in a complex event processing (CEP) environment on a computer system that includes at least one processor, the method comprising:
   receiving a stream of continuous event data;
   identifying a query to be run on the received stream, the query including at least one adaptable parameter;
   executing, using the computer system, the identified query;
   displaying results of the identified query in a user interface;
   receiving, via the user interface, input indicative of a change to the at least one adaptable parameter; and
   modifying, using the computer system, the at least one adaptable parameter of the identified query based on the received input, the at least one adaptable parameter being dynamically modified during the execution runtime of the identified query without having to redeploy the identified query and as the stream of continuous event data is being received.

2. The method of claim 1, further comprising:
receiving user input defining the query to be run; and
identifying the at least one adaptable parameter within the query.

3. The method of claim 2, wherein the at least one adaptable parameter is identified by a user.

4. The method of claim 2, wherein the at least one adaptable parameter is automatically detected during query parsing.

5. The method of claim 2, further comprising:
developing a logical query plan or graph based on the user input defining the query, the logical query plan or graph describing at a high level steps to be performed when the query is run; and
translating the logical query plan or graph into a physical query plan or graph, the physical query plan or graph including executable logic to be used in the execution of the query.

6. The method of claim 5, further comprising defining and registering access points for dynamically modifying the at least one adaptable parameter in connection with the translating of the logical query plan or graph into the physical query plan or graph.

7. The method of claim 5, further comprising improving or optimizing the logical query plan or graph based on initial settings of parameters that form parts of the query.

8. The method of claim 1, further comprising disposing within the user interface a control element associated with the at least one adaptable parameter, the at least one adaptable parameter being adjustable via its associate control element.

9. The method of claim 1, further comprising:
detecting whether a user has lingered on a query view for a predetermined amount of time; and
when it is determined that the user has lingered on the query view for the predetermined amount of time, adjusting parameters of the query associated with the query view so as to improve accuracy of the query.

10. The method of claim 1, further comprising:
detecting whether a user has lingered on a query view for a predetermined amount of time; and
when it is determined that the user has lingered on the query view for the predetermined amount of time, allocating resources such that the query associated with the query view is given an elevated priority compared to a situation where it is determined that the user has not lingered on the query view for the predetermined amount of time.

11. A method of configuring a computer system that includes at least one processor for executing queries in a complex event processing (CEP) environment, the method comprising:
receiving user input defining at least one continuous query to be run on at least one stream of event data;
parsing the at least one query so as to (a) identify at least one adaptable parameter within the at least one query and (b) develop a logical query plan or graph based on the user input defining the query, the logical query plan or graph describing at a high level steps to be performed when the query is run;
translating, using the computer system, the logical query plan or graph into a physical query plan or graph, the physical query plan or graph including executable logic to be used in the execution of the query; and
in connection with the translating of the logical query plan or graph into the physical query plan or graph, registering access points, using the computer system, enabling a user to dynamically modify the at least one adaptable parameter of the at least one query at execution runtime of the at least one query without interrupting execution of the at least one query and while continuing to receive the at least one stream of event data.

12. The method of claim 11, wherein the at least one adaptable parameter is identified by a user.

13. The method of claim 11, further comprising automatically detecting the at least on adaptable parameter of the at least one query during query parsing.

14. The method of claim 11, further comprising improving or optimizing the logical query plan or graph based on initial settings of parameters that form parts of the query.

15. A method of executing a query in a complex event processing (CEP) environment, the method comprising:
configuring a system in accordance with the process of claim 11;
executing the identified query;
displaying results of the identified query in a user interface; and
updating the query based on (a) user input received via a user interface indicative of a change to the at least one adaptable parameter directly, and/or (b) a way in which the user interacts with the user interface,
wherein the updating is performed without redeploying the query.

16. A non-transitory computer readable storage medium tangibly storing instructions that, when executed by at least one processor of a continuous event processing (CEP) system, perform a method according to claim 1.

17. A non-transitory computer readable storage medium tangibly storing instructions that, when executed by at least one processor of a continuous event processing (CEP) system, perform a method according to claim 11.

18. A non-transitory computer readable storage medium tangibly storing instructions that, when executed by at least one processor of a continuous event processing (CEP) system, perform a method according to claim 15.

19. A continuous event processing (CEP) system, comprising:
an adapter configured to receive data from at least one event stream;
a query design tool configured to receive user input corresponding to at least one query executable on at least one said event stream;
a query parser configured to (a) identify at least one adaptable parameter within the at least one query and (b) develop a corresponding logical query plan or graph based on the at least one query, each said corresponding logical query plan or graph specifying steps to be performed when the query is run;
a query translator configured to translate each said logical query plan or graph into a corresponding physical query plan or graph, each said physical query plan or graph including executable logic to be used in the execution of the query;
a register of access points enabling a user to dynamically modify the at least one adaptable parameter of the at least one query at execution runtime of the at least one query without having to redeploy the at least one query and while continuing to receive the at least one stream of event data;
at least one processor configured to execute the at least one query on the at least one stream based on the physical query plan or graph; and a user interface configured to display results of the query executed by the at least one processor, the user interface including one or more elements enabling the user to adjust the at least one adaptable parameter using the register of access points.

20. The system of claim 19, further comprising a monitoring thread configured to monitor ways in which the user interacts with the user interface and correspondingly adjust or recommend adjustments to the at least one adaptable parameter.

* * * * *